Dec. 6, 1949   S. GUARNASCHELLI   2,490,686
COUPLING FOR FLEXIBLE METAL HOSE
Filed March 29, 1947

INVENTOR.
Stephen Guarnaschelli
BY
Johnson and Kline
ATTORNEYS

Patented Dec. 6, 1949

2,490,686

UNITED STATES PATENT OFFICE 2,490,686

COUPLING FOR FLEXIBLE METAL HOSE

Stephen Guarnaschelli, Naugatuck, Conn., assignor to The Brockway Company, Naugatuck, Conn., a corporation of Connecticut Application March 29, 1947, Serial No. 738,064

6 Claims. (Cl. 285—72)

This invention relates to an improvement in connections for flexible metal hose of the type having a circumferentially (i. e. helically or concentrically) corrugated flexible metal tubing, and usually having a braided wire sheath surrounding the tubing.

In attaching a connecting unit to flexible metal hose of the aforesaid type, it has been proposed heretofore, as illustrated in my prior Reissue Patent 21,603, and United States Patent No. 2,112,238, to provide a pair of coupling members, one being adapted to encircle the flexible metal hose and the other having a clamping surface for engaging the end of the hose in leaktight relation. A collar was provided for insertion between the flexible tubing and its sheath, forming a clamp member cooperating with the first-named coupling member to grip the braided sheath between them, and engaging the corrugations adjacent the end of the tubing so as to advance the end of the latter into sealing engagement with the second coupling member.

In the embodiments of such connectors heretofore proposed, the coupling member encircling the hose had a conical flare at its leading end for receiving a collar with a corresponding external conical surface, between which the sheath of the hose was clamped. The internal surface of the collar was provided with corrugations interlocking with the convolutions of the tubing so as to advance the end of the tubing into engagement with the opposite coupling member. The projecting end of the portion of the corrugated tubing was compressed or hammered down against the end of the collar, collapsing the convolutions thereof so that the compressed portion was adapted to be clamped against a surface having an annular ridged abutment or a conical projection in sealing engagement. The provision of annular ridges or a conical projection on the clamping surface of the second coupling member requires relatively expensive forming or turning operations; and while a fairly reliable seal is formed for resisting high internal fluid pressures in the connection, expansion of the parts of the coupling at elevated temperatures sometimes tends to cause leakage.

I have now discovered that the surface of the second coupling member against which the end of the hose or tubing is clamped can be modified so as to render the connection more secure when subjected to high pressures and high temperatures, so that in effect higher internal pressures increase the sealing force in the connection. In addition, such modification of the clamping surface can be made by a simple boring operation, eliminating the expensive forming methods required for previous constructions.

Thus, in accordance with my invention, a clamping surface is provided on the second coupling member having an annular abutment for engaging the end surface of the compressed or collapsed convolutions at the end of the corrugated tubing, adjacent the periphery of said end surface, and having a shallow annular cavity (for example, of a diameter approximating that of the uncollapsed corrugated tubing) joining said abutment surface at a sharp corner, and having a gradually receding base surface into which collapsed convolutions of the tubing can expand when clamped against said abutment, or when subjected to internal pressure within the flexible hose.

When the tubing is forced against said abutment, the end convolutions expand into said shallow cavity and such expansion is accentuated when the interior of the hose is subjected to fluids under high pressure. This forces the end surface of the convolutions against the base of the cavity, increasing the strength of the seal between the flexible tubing and the coupling member.

Advantageously, the end surface of the corrugated tubing is coated with a layer of solder, which facilitates formation of a tight connection between the end surface of the tubing and the surfaces of the abutment and of the cavity, the solder being confined by the line of contact between the sharp corner surrounding the shallow cavity, and the surface of the collapsed convolutions.

The shallow cavity in the clamping surface of the coupling member of my invention is similar in shape to the end of a drill, and can be readily formed by a simple counterboring operation, avoiding the necessity of special turning or forming tools and operations heretofore required.

My invention will be more fully understood from the following description, taken in connection with the accompanying drawing, wherein.

Figure 1:
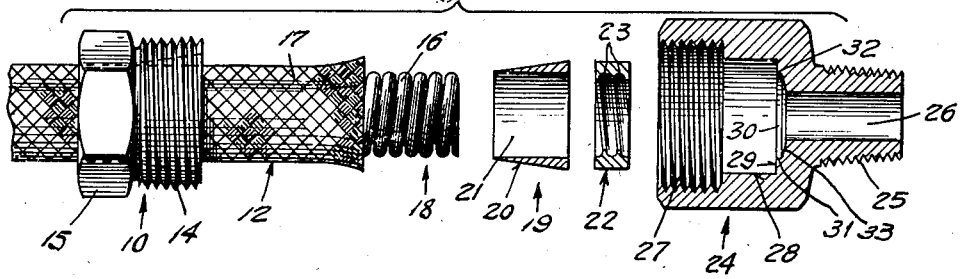
Figure 1 is an exploded view, in side elevation, of the end of a flexible metal hose and of the parts of my connector prior to assembly thereof, some of the parts being shown in axial cross-section.

Referring to the drawings, the connecting unit of my invention comprises a male coupling member or nut 10, having a bore 11 for encircling a length of flexible metal hose 12, and having a gradually flared conical surface 13 at the leading end of said bore, the forward part of the coupling member 10 has external threads 14, and at its rear end, a hexagonal portion 15 is provided for engaging a wrench.

The flexible metal hose 12 comprises helically corrugated metal tubing 16, and a braided wire sheath 17, of which the end is cut off somewhat shorter than the corrugated tubing so as to leave an end portion 18 of the latter extending beyond the end of the sheath 17. A sleeve 19 having an external conical surface 20 conforming to the shape of the conical flare 13 of the nut 10, has a bore 21 adapted to slide over the exterior of the flexible metal tubing 16, and is adapted when inserted between the sheath 17 and the tubing 16 to clamp the end of the sheath against the flared internal surface 13 of the nut 10.

The collar 22 has internal corrugations 23 of helical form, as shown, and is adapted thereby to be threaded on to the helical tubing 16, thus interlocking the corrugations 23 with those of the exterior of the tubing, and anchoring said collar on the tubing.

The opposite coupling member 24 is a hollow female fitting, as shown, having for example an externally threaded rearwardly extending projection 25 for securing said member to another structure, and a bore 26 extending through said projection for communicating with the passage of the flexible metal hose 12 when connected thereto. The member 24 includes a cup-shaped portion having internal threads 27 at its outer end for engaging the threads 14 on the nut 10, and a cylindrical wall 28 extending inward from said threads and terminating at an annular abutment or shoulder 29 at the base of its interior. A shallow annular cavity 30 is provided at the base of the interior of the female member surrounding and concentric with the bore 26, said cavity having a narrow cylindrical side wall 31 joining the abutment 29 at a sharp corner 32, and further having a gradually receding base surface 33, preferably of slightly concave contour.

The cavity 30 is of a shape adapted to be formed by counterboring the base of the cup-shaped portion of coupling member 24, whereby the end surface of the drill or boring tool forms the desired base surface 33 of said cavity.

In assembling my connection for flexible metal hose, the nut 10 is positioned on the hose as shown in Fig. 1 and the braided sheath 17 is cut back from the end of the hose to expose the end portion 18 of the tubing 16. Sleeve 19 is then slid over the projecting end portion of the tubing, and wedged inward between the tubing 16 and the braid 17. The ring 22 is threaded on to the convolutions of tubing 16 until it abuts the sleeve 17. The end portion 18 of the tubing extending outward from the ring 22 is hammered down or compressed against the end of the ring, thus locking the latter on the end of the tubing. The collapsed convolutions form a flange 34 of slightly greater diameter than the tubing 16, said flange having a substantially flat end surface. Said end surface is then provided with a coating or layer of solder 35 to improve its sealing qualities.

Figure 2:
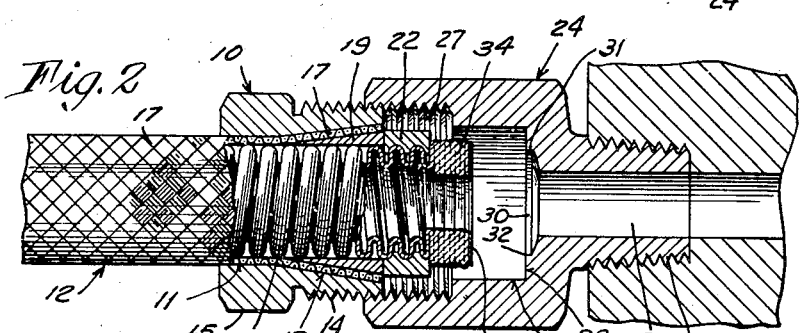
Fig. 2 is an axial cross-section of the connector unit assembled with flexible metal hose prior to making up of the connection.
Figure 3:
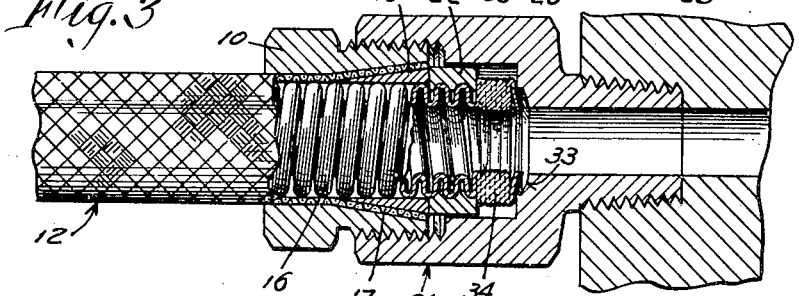
Fig. 3 is a view similar to Fig. 2 showing the connection after it has been made up.

The nut 10 is then brought forwardly along the hose 12, until its conically flared internal surface 13 clamps the braided sheath 17 against the conical external surface 20 of the sleeve 19. Then the nut 10 is threaded into the coupling member 24, as shown in Fig. 2, to advance the flange 34 on the tubing toward abutment 29. As the threading operation is continued, the end surface of flange 34 on the corrugated tubing 16 is forced against the abutment 29 at the base of the hollow coupling member 24. The relatively sharp corner 32 thereupon bites into the face of the collapsed convolutions of flange 34 adjacent their periphery, and forces the inner portions of the convolutions to expand into the cavity 30, the solder 35 thereby being compressed against the base 33 of said cavity.

Figure 4:
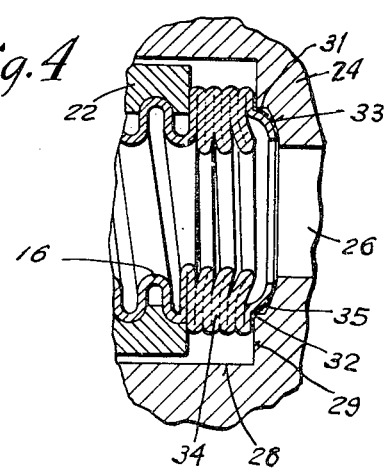
Fig. 4 is an enlarged fragmentary section showing the condition of the parts after being subjected to high internal pressure.

When the connection thus formed is subjected to relatively high internal fluid pressure, the fluid within the interior of the connection forces the collapsed convolutions of the flange 34 apart at the end thereof, causing the end surface of said flange to seat even more firmly against the base of cavity 30 (see Fig. 4), and thereby increases the resistance of the connection to leakage. The solder 35 fills in any irregularities in the contacting surfaces and is itself confined against blowing out by the seal formed at the line of contact between the corner 32 and the face of the flange 34. An exceedingly reliable connection results, capable of withstanding high pressures and superior in this respect to connections of the prior art.

To utilize my improved form of coupling for flexible hose having tubing with concentric corrugations, the ring 22 and sleeve 19 can be made integral and split longitudinally in halves or larger numbers of segments. The ring 22 has concentric, rather than helical, ridges on its interior surface corresponding with the concentric convolutions of the tubing with which it is used. When the nut 10 is assembled with the other parts, including the split ring 22 and split collar 19, the nut holds the halves or segments together until the nut is threaded into the female member 24. The concentric ridges within the ring 22 anchors it on the tubing, otherwise operation of the connection is the same as in the case of helically corrugated tubing, as hereinbefore described.

Figure 5:
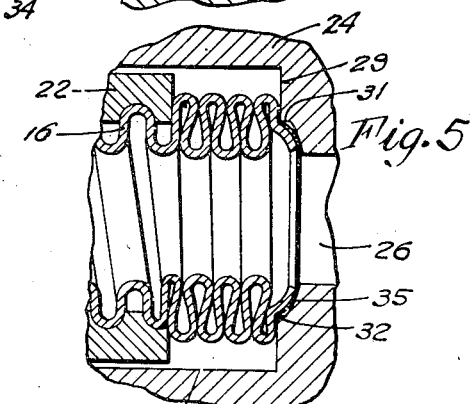
Fig. 5 is a view similar to Fig. 4 but showing a modified form of the present invention.

In the modified form shown in Fig. 5, which is similar in construction and assembly of parts as shown in Fig. 1, the end portion 18 of the metal tubing 16 need not be hammered down against the end of the ring 22 previous to making the coupling, for if there are only three or four convolutions of the tubing 16 extending beyond the ring 22, the end portion 18 will be in axial alignment with the sharp corners 32 of the cavity 30 and always provide a peripheral bite thereof.

When the nut 10 is threaded into the coupling member 24, the end surface of the tubing 18 is forced against the abutment 29 at the base of the hollow coupling member 24. The sharp corner 32, having a smaller diameter than the outside diameter of the tubing 16, bites into the face and as the threading operation is continued collapses the convolutions of the tubing 16 to bring them together in abutting relation as shown in Fig. 5.

When the nut 10 is fully threaded into the coupling member 24, the inner portions of the convolutions expand into the cavity 30 and upon being subjected to high internal fluid pressure will be more firmly seated against the base of the cavity 30 to further seal the connection.

Variations and modifications may be made within the scope of this invention and portions of the improvements may be used without others.

I claim:

1. In a connection for flexible metal hose including a length of circumferentially corrugated metal tubing, a coupling member for encircling said tubing; means for securing said member to said tubing adjacent the end thereof; a second coupling member for engaging the end of said tubing; draft means for advancing said coupling members toward each other; said second coupling member having an annular abutment including a relatively sharp corner for engaging the end surface of a series of collapsed corrugations at the end of said tubing, adjacent the periphery of said end surface, in leaktight relation; and a shallow cavity surrounded by said abutment and joining the same at said sharp corner, and formed with a receding base surface against which the inner portions of said compressed corrugations are pressed when the end of said tubing is clamped against said abutment whereby internal pressure in the tubing presses the end convolution into sealing engagement with said surface.

2. A flexible metal hose connection comprising a length of circumferentially corrugated flexible metal tubing, having a number of its corrugations compressed together at the end thereof; a coupling member encircling said tubing and secured to said tubing behind said compressed corrugations; a second coupling member for engaging the end of said tubing, and having an annular abutment including a relatively sharp corner for leaktight engagement with the end surface of said compressed corrugations adjacent their periphery; draft means for advancing said first-named coupling member and the tubing to which it is secured toward said annular abutment; and a shallow cavity surrounded by said abutment and joining the same at said sharp corner, and formed with a receding base surface against which the inner portions of said compressed corrugations are pressed when the end of said tubing is clamped against said abutment, whereby internal pressure in the tubing presses the end convolution into sealing engagement with the surface of said recess.

3. A flexible metal hose connection as defined in claim 2 wherein the end surface of said collapsed corrugations is coated with a layer of solder.

4. A flexible metal hose connection comprising a length of circumferentially corrugated flexible metal tubing, having a number of its corrugations compressed together at the end thereof; a collar encircling said tubing behind said compressed corrugations, said collar having a correspondingly corrugated inner surface interlocking with the tubing corrugations to anchor the collar thereon against relative axial movement, said collar abutting the rear of said compressed corrugations; a coupling member for engaging the end of said tubing, and having an annular abutment including a relatively sharp corner for leaktight engagement with the end surface of said compressed corrugations adjacent their periphery; draft means for advancing said collar and the tubing engaged thereby toward said annular abutment; and a shallow cavity surrounded by said abutment, joining the same at said relatively sharp corner, and having a gradually receding inner surface, the inner portion of said compressed corrugations expanding into said cavity and forming a seal with the inner surface thereof when the end of said tubing is clamped against said abutment, whereby internal pressure in the tubing presses the end corrugation into sealing engagement with the surface of said cavity.

5. A flexible metal hose connection as defined in claim 4 wherein said shallow cavity is a shallow counterbore of slightly smaller diameter than the periphery of said compressed corrugations.

6. A coupling for flexible metallic hose including a length of corrugated metallic tubing having the end convolutions compressed together, comprising a coupling member having an inner annular abutment provided with a shallow recess and a surrounding annular shoulder, and means for pressing the end of said tubing against said abutment so as to cause said shoulder to engage the end convolution adjacent its periphery and form a line seal therewith, and cause the inner portion of the end convolution to expand into engagement with the surface of the recess, whereby internal pressure in the tubing presses said end convolution into sealing engagement with the surface of the recess.

STEPHEN GUARNASCHELLI.

REFERENCES CITED

The following references are of record in the file of this patent:

UNITED STATES PATENTS

| Number | Name | Date |
|---|---|---|
| 1,315,784 | Levitt | Sept. 9, 1919 |
| 1,936,815 | Wilkinson | Nov. 28, 1933 |
| 2,363,586 | Guarnaschelli | Nov. 28, 1944 |